United States Patent [19]

Bowyer

[11] Patent Number: 5,105,727
[45] Date of Patent: Apr. 21, 1992

[54] SPRING BRAKE ACTUATOR WITH AN ANNULAR EDGE OF A DIAPHRAGM SEALED BETWEEN A TUBULAR PART OF A PRESSURE PLATE AND AN ACTUATOR ROD

[75] Inventor: John P. Bowyer, Muskegon, Mich.

[73] Assignee: Neway Corp., Muskegon, Mich.

[21] Appl. No.: 638,440

[22] Filed: Jan. 4, 1991

[51] Int. Cl.$^5$ .............................................. F01B 7/00
[52] U.S. Cl. ...................................................... 92/63
[58] Field of Search ............................. 92/48, 62-64, 92/369.2

[56] References Cited

U.S. PATENT DOCUMENTS

| | | |
|---|---|---|
| 3,020,094 | 2/1962 | Murty et al. ........................... 92/63 |
| 3,101,219 | 8/1963 | Herrera . |
| 3,548,720 | 12/1970 | Swander, Jr. . |
| 3,696,711 | 10/1972 | Berg et al. . |
| 3,730,056 | 5/1973 | Swander, Jr. . |
| 4,043,251 | 8/1977 | Ohmi . |
| 4,353,291 | 10/1982 | Hauduc . |
| 4,640,135 | 2/1987 | Kastel et al. ............................ 92/97 |
| 4,664,016 | 5/1987 | Tobisawa et al. ................. 91/369.2 |
| 4,850,263 | 7/1989 | Rumsey et al. . |
| 4,936,758 | 6/1990 | Coble ............................. 92/1035 D |

Primary Examiner—Edward K. Look
Assistant Examiner—F. Daniel Lopez
Attorney, Agent, or Firm—Varnum, Riddering, Schmidt & Howlett

[57] ABSTRACT

A brake actuating mechanism comprises a housing formed of facing shells with an elastomeric diaphragm suspended between them. A centrally disposed opening in the housing permits an actuating rod disposed within the housing to reciprocate through the opening. The diaphragm also has a centrally disposed opening. A pressure plate having a tubular section engages one side of the diaphragm. A spring is disposed between the pressure plate and the housing. The actuating rod extends through the opening in the diaphragm and is press-fit into the tubular section thereby simultaneously compressing the edge of the opening against the tubular section to form an airtight seal.

22 Claims, 2 Drawing Sheets

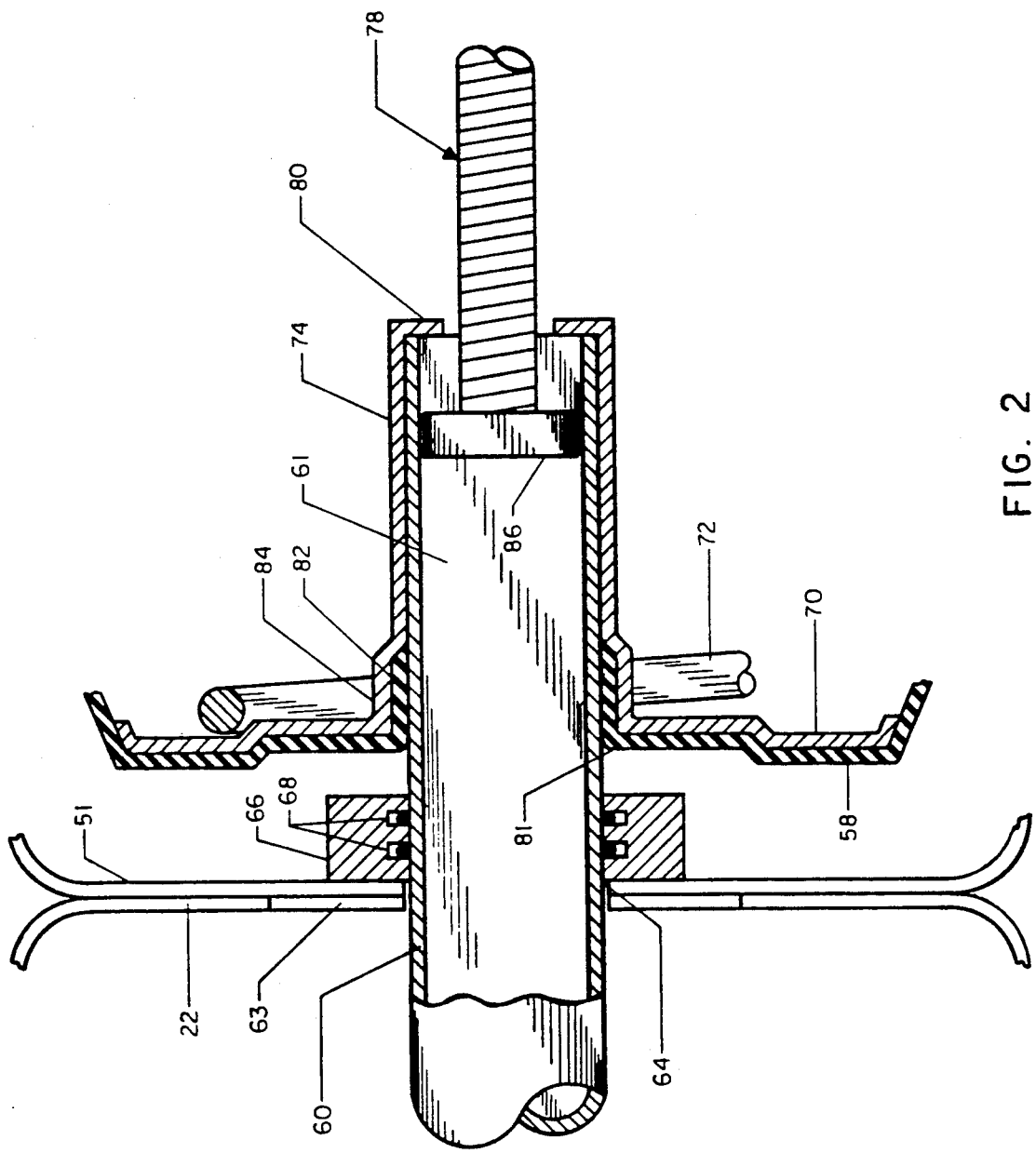

SPRING BRAKE ACTUATOR WITH AN ANNULAR EDGE OF A DIAPHRAGM SEALED BETWEEN A TUBULAR PART OF A PRESSURE PLATE AND AN ACTUATOR ROD

BACKGROUND OF THE INVENTION

FIELD OF THE INVENTION

The invention relates to air-operated diaphragm brakes for vehicles and particularly to combination service and emergency brake actuator assemblies.

STATE OF THE PRIOR ART

An air brake system for a vehicle such as a bus, truck or the like typically includes a brake shoe and drum assembly which is actuated by means of an actuator assembly operated by the selective application of compressed air. Conventional air brake actuators have both a service brake actuator for actuating the brakes under normal driving conditions by the application of compressed air and an emergency brake actuator which causes actuation of the brakes when air pressure has been released. The emergency brake actuator includes a strong compression spring which forces application of the brake when air is released. This is often referred to as the spring brake. Typically, the spring brake actuator is disposed in tandem with the service brake actuator. When full pressure is applied to the emergency brake actuator, air pressure acting against a diaphragm compresses the spring. A spring brake actuator rod is held in a retracted position by a relatively small return spring, thus not affecting the operation of the brake. When the brake is to be applied during normal driving operation, compressed air is provided to the service brake actuator which, acting against a diaphragm, causes a service brake push rod to be extended and causes the brakes to be applied with an application force which is proportional to the air pressure applied to the service brake actuator. In the event of a loss of air pressure or an intentional exhaustion of air from the spring brake actuator, the brake will be mechanically activated by the force of the emergency brake spring acting on the spring brake actuator rod which in turn acts upon the service brake push rod to apply the brakes. Thus, the spring brake portion serves both as a parking brake and an emergency brake.

U.S. Pat. No. 4,850,263 discloses a known spring brake assembly which includes both a spring brake portion and a service brake portion. The service brake portion includes an air chamber partially defined by a flexible diaphragm acting against a service brake push rod and a return spring to assure proper release of the brake when air is exhausted from the air chamber. The spring brake portion also includes an air chamber partially defined by a diaphragm acting against a spring pressure plate to compress the emergency brake spring when air pressure is supplied to the chamber. An actuating rod having one end engaging a surface of the diaphragm internal to the chamber is pushed outwardly from the chamber through a housing opening and bearing provided with a pneumatic seal to engage the diaphragm and push rod of the service brake and to cause the brake to be applied. The spring brake portion is provided with a return spring surrounding the spring brake actuator rod which forces the one end of the actuating rod against the diaphragm.

One problem with this and other similar prior art brake arrangements is that the spring brake actuating rod must be kept in linear alignment with the opening and bearing within close tolerances. Excessive wear on the actuator rod and, particularly, the pneumatic seal can occur when the spring brake actuator rod is not properly aligned. The above-noted prior patent discloses the use of an indentation in the pressure plate engaging the main spring and in the diaphragm engaging the pressure plate to aid in the alignment of the actuator rod as it is returned by the force of the return spring contained in the air chamber. Besides aiding in the alignment of the actuator rod, the return spring serves a further purpose, namely, to prevent the spring brake actuator rod from escaping through the bearing opening by the force of the compressed air internal to the emergency brake chamber which might occur, for example, when the service brake is actuated.

The emergency brake may typically be manually disengaged by means of a tool known as a caging tool which is inserted in a central opening extending into the emergency spring pressure plate to draw the pressure plate in close proximity of the housing wall of the emergency brake portion, thereby compressing the emergency brake spring. Such manual disengagement may be necessary for brake maintenance or to move a truck or trailer without the aid of air pressure. Typically, the caging tool is a threaded rodlike device. A separate housing is provided on the brake for storing the caging tool. One common problem with the arrangement is that the caging tool may have been exposed to water or salt and may have become corroded when it is needed. A dust cover provided on the emergency brake housing, which may also be corroded, will be removed before the manual disengagement of the brake can be accomplished. All of this tends to make the manual disengagement of the emergency brake a messy and time-consuming task.

Other problems with prior art brake assemblies include a multiplicity of parts, the cost of the various parts of the brake assembly and the expense of the various assembly steps required in manufacture of the brake assembly. Furthermore, individual parts, such as springs, may fail from fatigue and the failure of any one of the several parts of the actuating assembly requires that the entire assembly be replaced, thereby placing the vehicle out of commission for repairs.

SUMMARY OF THE INVENTION

These and other disadvantages of the prior art are overcome in accordance with this invention by a brake actuating assembly having a spring brake portion comprising a spring brake actuator rod formed integral with a spring brake pressure plate and secured to the spring brake diaphragm. The spring brake diaphragm, in accordance with this invention, is provided with a centrally disposed aperture having an annular edge and the actuator rod extends through the opening and engages the annular edge to form an airtight seal. Advantageously, the need for a return spring in the spring brake pressure chamber is eliminated, thereby, eliminating the cost of the spring and associated pressure plates Accordingly, the number of parts of the brake actuating unit is reduced, resulting in lower cost and reduced chances of brake actuator failure.

In accordance with a particular aspect of the invention, the spring brake pressure plate comprises a relatively flat portion engaging one end of the brake spring and a tubular section and a portion of the actuator rod securely attached to the tubular section. The tubular section of the pressure plate may be press-fit to the actuating rod and may be further provided with an inwardly directed end edge for engaging one end of the actuator rod to ensure proper engagement between the rod and the pressure plate.

In accordance with one specific aspect of the invention, the annular edge of the central opening of the diaphragm is clamped between a portion of the pressure plate and the actuating rod to form the airtight seal.

In accordance with another aspect of the invention, the actuator rod may be a hollow actuator rod provided with a central bore and a brake releasing caging bolt may be extended into the central bore. The bolt may be provided with an end plate for engaging the spring brake pressure plate to draw the spring to a compressed state. Advantageously, the caging tool may be permanently retained in the hollow actuating rod to be readily available, thereby eliminating the need for a separate housing area to store the caging bolt. It also eliminates the steps of removing the caging bolt from the housing, removing a dust cover and properly inserting the caging bolt for engagement with the spring pressure plate or the like. Advantageously, in accordance with the present invention, the caging bolt is maintained in a sealed housing, free from corrosive elements and may be used to cage the spring without the sometimes troublesome task of establishing proper engagement between the caging tool and the spring pressure plate.

BRIEF DESCRIPTION OF THE DRAWING

FIG. 2 is an enlarged fragmentary cross-sectional view of the spring brake actuator arrangement of FIG. 1.

DETAILED DESCRIPTION

Figure 1:
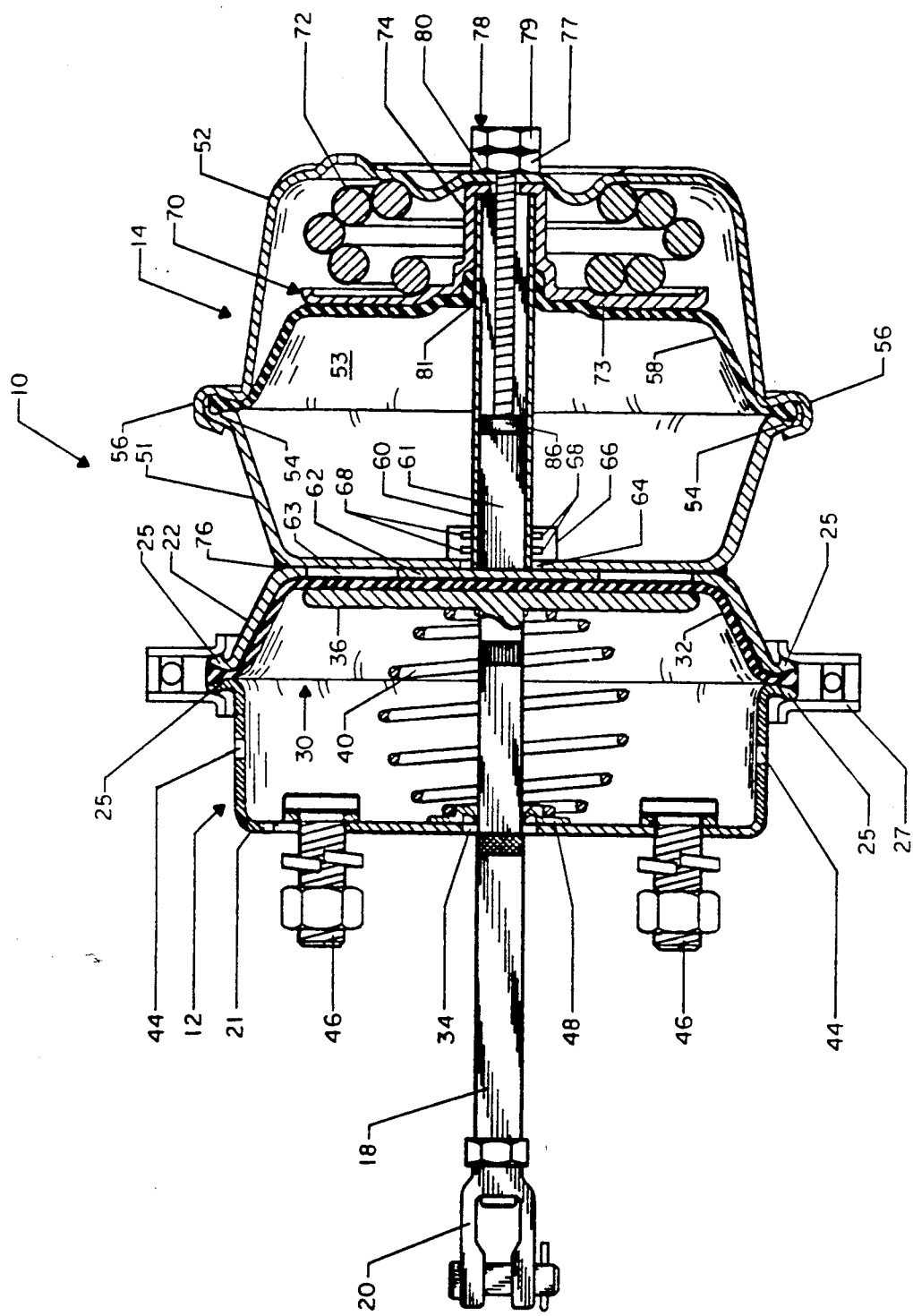
FIG. 1 is a cross-sectional view of an air-operated brake actuating assembly having a spring brake actuator arrangement in accordance with the principles of this invention.

FIG. 1 shows a cross-sectional view of an air-operated brake actuating unit 10 having a general configuration well known in the art. The actuating unit 10 comprises a service brake portion 12 mounted in tandem to a spring brake or emergency brake portion 14. A service brake push rod 18 extends from the service brake 12 for reciprocating motion and is provided with a clevis 20 which is adapted to connect to a conventional brake shoe and drum (not shown in the drawing) in a standard fashion. Reciprocating motion of the push rod 18 will cause the brake to be alternately applied and released.

The service brake 12 comprises a pair of facing cup-shaped housing sections 21 and 22, each having an outwardly directed flanged edge 25. The housing sections 21 and 22 are clamped together at their flanged edges by means of a clamp 27 to form a service brake inner chamber 30. An elastomeric diaphragm 32 is suspended within the inner chamber 30 and is compressed at the peripheral edge thereof between flanged edges 25 of the housing sections 21 and 22. The service brake push rod 18 extends through a central opening 34 in housing section 21 and into the service brake chamber 30 where it terminates in a pressure plate 36. A compression spring 40 extends between pressure plate 36 and the interior surface of the housing section 21. A spring seat 48 is disposed around the central opening 34 to receive the end of the compression spring 40 and retain it in position around the opening 34. The spring 40 thus urges the pressure plate 36 and the service brake push rod 18 to a fully retracted position as depicted in FIG. 1. To operate the service brake, compressed air is introduced through an air service port in housing section 22 (not shown in the drawing) to force the diaphragm 32 and pressure plate 36 against the force of spring 40 to actuate the push rod 18. Openings 44 are provided in the housing section 21 to allow for the rapid evacuation of air from the inner chamber 30. Mounting studs 46 are provided to mount the brake actuating unit 10 onto a brake assembly.

The spring brake 14 comprises a pair of facing cup-shaped housing sections 51 and 52 joined at their edges to form an inner chamber 53. Housing section 51 is provided with an outwardly directed circumferential flanged edge 54. The housing sections 51 and 52 are clamped together by means of a peripheral curved edge 56 on housing section 52 engaging edge 54 on housing section 51. An elastomeric diaphragm 58 is suspended within the spring brake chamber 53 and is compressed at its peripheral edge between the edges 54, 56 of housing sections 51 and 52. The portion of the chamber 53 between the diaphragm 58 and housing section 51 forms an air chamber which is filled with compressed air supplied through an air service port in housing section 51 (not shown in the drawing) when the emergency brake is in its normal released position. An actuator rod 60, aligned with push rod 18, has one end extending through a central opening 64 in an end wall of housing section 51. The one end of actuator rod 60 terminates in a reaction plate 62 disposed in an aligned central opening 63 in an end wall of housing section 22. Opening 64 is provided with a bearing 66 having annular recesses to accommodate a pair of O-ring seals 68. Bearing 66 forms a bearing surface and an airtight seal for actuator rod 60. The other end of actuator rod 60 extends through a centrally disposed aperture 81 in the diaphragm 58 and terminates in a pressure plate 70 which engages spring brake compression spring 72. The pressure plate 70 comprises a substantially flat portion 73 engaging one end of spring 72 and a tubular portion 74 extending generally axially along the axis of spring 72. The tubular portion 74 is press-fit onto an end portion of actuator rod 60 such that the pressure plate 70 and the rod 60 form an integral unit. The pressure plate 70 may be formed of cast aluminum.

During normal operation of the brake 10, the actuator rod 60 will be in the fully withdrawn position, as depicted in FIG. 1, by means of compressed air which is maintained in the portion of the chamber 53 defined by the diagram 58 and housing section 51. When the compressed air is exhausted, compression spring 72, one end of which engages the outer end wall of housing section 52, forces the pressure plate 70 and rod 60, integrally attached to the pressure plate, in the direction of the brake push rod 18 of the service brake 12. The housing section 22 of the service brake 12 and housing section 51 of the spring brake 14 may be steel shells attached to each other by means of a circumferentially extending weld bead 76 or other suitable attachment means. The force of spring 72 causes actuator rod 60 to be extended through the central opening 64 and causes the reaction plate 62 to apply a force to the diaphragm 32 and pressure plate 36 of the service brake 12. This action causes the service brake push rod 18 to be actuated and the brake to be applied. When the brake is to be released, compressed air is once again introduced in the space between housing section 51 and diaphragm 58. The force of the compressed air against diaphragm 58 causes pressure plate 70, rod 60 and spring 72 to be returned to the position depicted in FIG. 1.

The actuator rod 60 may be a hollow tube or rod provided with a central bore 61 to accommodate a brake release or caging rod or tool 78. As shown in greater detail in FIG. 2, the tool 78 is adapted to engage an end edge 80 of the tubular portion 74 of pressure plate 70 to maintain the spring 72 in a compressed position whenever such is desired. The tool may be used to manually release the spring brake or to ensure that the compression spring 72 will remain compressed when maintenance functions are performed on the brake assembly. The tool 78 may be a threaded bolt or the like engaging a fixed threaded opening or nut such as nut 77 affixed by welding to the end wall of housing section 52. A second nut or head 78 is fixedly attached to the threaded bolt such that the bolt may be rotated in nut 77 by a common wrench or the like.

FIG. 2 is an enlarged fragmentary view of the actuator rod 60 and its integrally attached pressure plate 70 showing the rod 60 in a partially extended position. FIG. 2 shows more clearly that the actuator rod 60 extends through the diaphragm 58 at a central opening 81. The opening 81 may be formed with a peripheral flanged tubular section or collar 82 circumferentially engaging the outer surface of the actuator rod 60 and may be attached to that surface by a suitable adhesive. Alternatively, the central opening 81 may be of a diameter somewhat smaller than that of actuator rod 60 to provide excess material for a collar or annular edge adjacent actuator rod 60. As noted earlier, the pressure plate 70 is provided with a tubular section 74 which is circumferentially press-fit on push rod 60. The tubular section 74 of the pressure plate 70 is provided with an expanded portion 84 which accommodates the collar 82 of the diaphragm 58 and further presses the collar 82 against the outside surface of actuator rod 60 to maintain an airtight attachment between the push rod 60 and diaphragm 58.

As can be more clearly seen from FIG. 2, the tubular section 74 of pressure plate 70 is provided with an inwardly directed annular end edge 80. The end edge 80 provides positive engagement with the walls of actuator rod 60 when the rod is actuated and further serves as an engagement surface for a shoulder or end plate 86 of caging tool 78. Such an annular flange may also be disposed on the actuator rod if the rod is hollow. Plate 86 engages the edge 80 when the tool 78 is withdrawn to retain the compression spring 72 in its compressed state. Otherwise, the tool 78 extends into the central bore 61 of actuator rod 60 by a sufficient distance to allow the actuator rod 60 to extend to its full length of travel without engagement between the edge 80 and reaction plate 86. The caging tool 78 may, for example, be a steel bolt and the standard hexagonal head of such a bolt may serve the function of the reaction plate 86.

Reasonable variation and modification are possible within the scope of the foregoing disclaimer without departing from the spirit of the invention as defined in the appended claims.

I claim:

1. A brake actuating mechanism comprising:

a housing having first and second end walls with an opening centrally disposed in the first end wall;

an elastomeric diaphragm suspended within the housing and dividing the interior thereof into a first chamber and a second chamber, said diaphragm having a centrally disposed aperture defined by an annular edge, said aperture being substantially axially aligned with the opening;

a cylindrical brake actuating rod disposed in the first chamber for reciprocating movement relative to the housing and having a first end extending through the opening in the first end wall, and a second end extending through the aperture in the diaphragm, the annular edge thereof in sealing engagement with an outer surface of the cylindrical portion of said actuating rod to form an airtight seal with said annular edge;

a spring disposed within the second chamber having one end engaging the second end wall; and a plate disposed within the second chamber and having a flat portion, said flat portion having one surface engaging another end of the spring and another surface engaging the diaphragm, and said plate being securely attached to the actuator rod second end.

2. A brake actuating mechanism according to claim 1 wherein the plate has a centrally disposed tubular section which receives the actuator rod second end.

3. A brake actuating mechanism according to claim 2 wherein the tubular section receives the actuator rod second end in press-fit engagement.

4. A brake actuating mechanism according to claim 3 wherein the tubular section covers a portion of the annular edge and compresses the annular edge against the actuator rod to form the airtight seal.

5. A brake actuating mechanism according to claim 4 wherein the actuator rod is tubular having a central bore.

6. A brake actuating mechanism according to claim 5 and further comprising a brake release rod having a distal end extending into the central bore, said distal end having a shoulder, and wherein the tubular section has an inwardly directed annular flange for engagement with the shoulder of the brake release rod.

7. A brake actuating mechanism according to claim 1 wherein the plate has a portion which compresses the annular edge against the actuator rod to form the airtight seal.

8. A brake actuating mechanism according to claim 7 wherein the actuator rod is secured to the annular edge by an adhesive.

9. A brake actuating mechanism according to claim 1 wherein the actuator rod is secured to the annular edge by an adhesive.

10. A brake actuating mechanism according to claim 1 wherein the actuator rod is tubular having a central bore.

11. A brake actuating mechanism according to claim 10 and further comprising a brake release rod having a distal end extending into the central bore, said distal end having a shoulder, and wherein the actuator rod second end has an inwardly directed annular flange for engagement with the shoulder of the brake release rod.

12. An air-operated brake assembly for a vehicle, comprising:

a service brake housing;

a spring brake housing arranged in tandem with and attached to said service brake housing;

a brake actuating push rod having one end extending outwardly from said service brake housing and another end disposed internally of said service brake housing for reciprocating motion relative thereto;

a compression spring in said service brake housing acting on said push rod for forcing said push rod toward a retracted position;

centrally disposed aligned openings in said service brake housing and said spring brake housing;

a diaphragm suspended in said spring brake housing and having a centrally disposed aperture having an annular edge;

an actuator rod disposed in said spring brake housing in alignment with said brake actuating push rod and having one end extending through said aligned openings and another end extending through said opening in said diaphragm, a portion of said actuator rod engaging said annular edge in sealing engagement therewith to form an air-tight seal with said annular edge;

a spring brake compression spring disposed in said spring brake housing having one end engaging an end wall of said spring brake housing; and a pressure plate disposed in said spring brake housing having a substantially flat portion having one surface engaging another end of said spring brake spring and another surface engaging said diaphragm and having a centrally disposed tubular section extending along a portion of said actuator rod and securely attached to said actuator rod.

13. The brake assembly in accordance with claim 12 wherein said tubular section covers a portion of said annular edge of said aperture of said diaphragm compressing said annular edge against said actuator rod to form said airtight seal between said diaphragm and said actuator rod.

14. The brake assembly in accordance with claim 13 wherein said tubular section comprises an inwardly directed end edge and said actuator rod comprises an end surface engaging said end edge.

15. The brake assembly in accordance with claim 12 wherein said actuator rod comprises a hollow rod having a central bore.

16. The brake assembly in accordance with claim 15 and further comprising a brake release rod having a distal end extending into said central bore and having a shoulder near its distal end and wherein said tubular section of said actuator rod comprises an inwardly directed end edge for engagement with said shoulder of said brake release rod.

17. The brake assembly in accordance with claim 12 wherein said spring brake compression spring comprises an axially extending central open area and wherein said tubular section extends into said axially extending open area.

18. The brake assembly in accordance with claim 12 wherein said tubular section is attached to said actuator rod by press-fit.

19. In a fluid pressure-operated diaphragm spring brake having a housing, an elastomeric diaphragm suspended in the housing to divide the interior thereof into first and second chambers, said diaphragm having an aperture in a central portion thereof, a pressure plate adjacent to the diaphragm in the first chamber, a coil spring in the first chamber between the pressure plate and the housing, and an actuator rod in the second chamber for actuating a brake mechanism in response to movement of the diaphragm and pressure plate, the improvement wherein:

the diaphragm has an annular band defining the aperture, the actuator rod extends through the aperture;

the annular band is configured to grip the actuator rod in sealing engagement therewith; and the pressure plate has formed therein a sleeve which tightly overlies the annular band whereby the annular band is clamped between the sleeve and the actuator rod.

20. The spring brake according to claim 19 wherein the pressure plate has a tubular portion which comprises the sleeve and the actuator rod is received in the tubular portion in press-fit engagement whereby the annular band is simultaneously clamped between the actuator rod and the sleeve.

21. The spring brake according to claim 20 wherein the sleeve is a stepped section of the tubular portion.

22. The spring brake according to claim 19 wherein the diameter of the aperture is less than the diameter of the actuator rod.

* * * * *